United States Patent
Robert

(10) Patent No.: US 6,737,632 B2
(45) Date of Patent: May 18, 2004

(54) CONTROL DEVICE WITH MOBILE COMPONENT MOUNTED ON A BALL PIVOT

(76) Inventor: Emmanuel Robert, 24 rue Maurice Massias, F-13014 Marseille (FR)

( * ) Notice: Subject to any disclaimer, the term of this patent is extended or adjusted under 35 U.S.C. 154(b) by 0 days.

(21) Appl. No.: 10/050,111

(22) Filed: Jan. 18, 2002

(65) Prior Publication Data

US 2003/0034442 A1 Feb. 20, 2003

(30) Foreign Application Priority Data

Aug. 20, 2001 (FR) .............................. 01 10932

(51) Int. Cl.⁷ .............................. G06M 7/00; H01J 40/14
(52) U.S. Cl. ................ 250/221; 250/222.1; 345/161
(58) Field of Search .................. 250/221, 222.1; 345/151, 156, 157, 184

(56) References Cited

U.S. PATENT DOCUMENTS

| | | | | | |
|---|---|---|---|---|---|
| 4,250,378 A | * | 2/1981 | Mutton | .................. | 250/221 |
| 4,533,827 A | * | 8/1985 | Fincher | .................. | 250/214 PR |
| 4,533,830 A | * | 8/1985 | Beauprey | .................. | 250/231.14 |
| 4,686,361 A | * | 8/1987 | Bard | .................. | 250/221 |
| 4,731,530 A | * | 3/1988 | Mikan | .................. | 250/229 |
| 4,748,323 A | * | 5/1988 | Holiday | .................. | 250/221 |
| 5,117,102 A | * | 5/1992 | Mitchell | .................. | 250/229 |
| 5,223,709 A | | 6/1993 | Pettypiece, Jr. | | |
| 5,532,476 A | * | 7/1996 | Mikan | .................. | 250/221 |
| 5,861,876 A | | 1/1999 | Nakayama | | |
| 6,172,354 B1 | * | 1/2001 | Adan et al. | .................. | 250/221 |
| 6,222,179 B1 | * | 4/2001 | Mikan | .................. | 250/221 |
| 6,246,047 B1 | * | 6/2001 | Mikan | .................. | 250/221 |
| 6,259,433 B1 | * | 7/2001 | Meyers | .................. | 345/161 |
| 6,344,846 B1 | * | 2/2002 | Hines | .................. | 345/166 |
| 6,482,010 B1 | * | 11/2002 | Marcus et al. | .................. | 434/45 |
| 6,489,946 B1 | * | 12/2002 | Takeda et al. | .................. | 345/161 |

FOREIGN PATENT DOCUMENTS

| | | |
|---|---|---|
| EP | 0 076 032 A | 4/1983 |
| FR | 2 407 511 A | 5/1979 |
| WO | WO 86 04166 A | 7/1986 |

* cited by examiner

Primary Examiner—G. Bradley Bennett
Assistant Examiner—Yaritza Guadalupe
(74) Attorney, Agent, or Firm—Lawrence E. Laubscher, Sr.

(57) ABSTRACT

A control device comprising a mobile component such as a lever mounted on a ball pivot, wherein the lever is displaceable in rotation around three different axes and the device comprises two arrays of photodetectors for detecting points uniformly distributed over supports with the shape of a portion of a sphere, the arrays being fixed and the supports being borne by the lever.

13 Claims, 1 Drawing Sheet

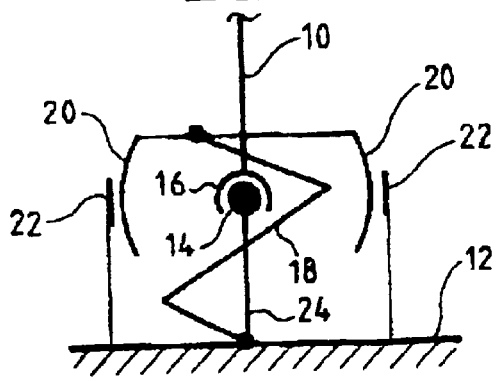
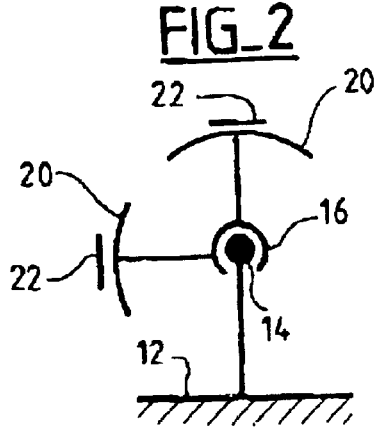
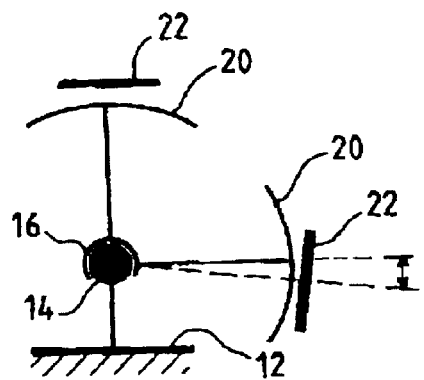
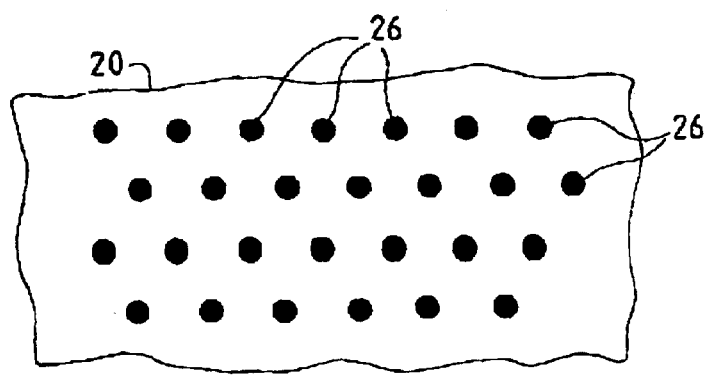
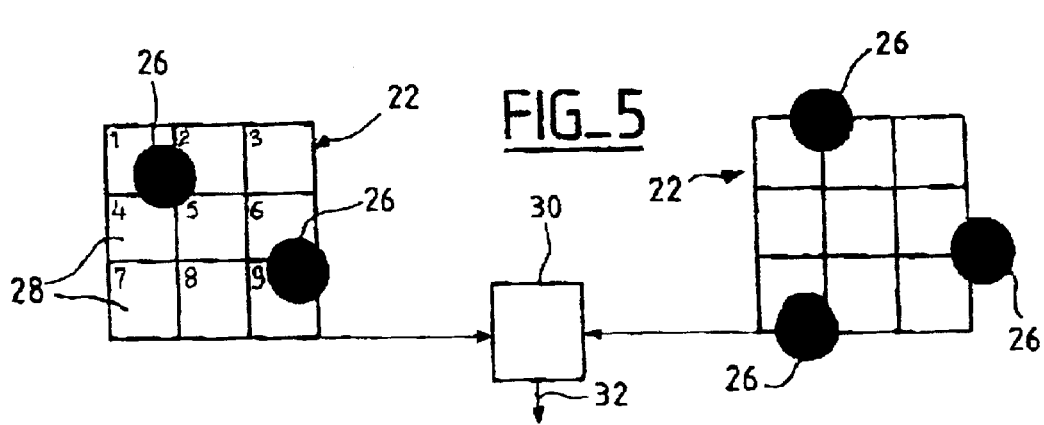

CONTROL DEVICE WITH MOBILE COMPONENT MOUNTED ON A BALL PIVOT

BACKGROUND OF THE INVENTION

1. Field of the Invention

The present invention relates to a control device with a mobile component mounted on a ball pivot, this device comprising means for detecting the position of the mobile component, connected to information processing means which generate signals representing the displacement of said component with respect to two or three axes of rotation.

2. Brief Description of the Prior Art

Various means have already been proposed for detecting displacements of a mobile component formed of a lever in such a device, however, the known means have various notable drawbacks. For example, potentiometric sensors have problems of contact wear and fouling, they are lacking in linearity and they are sensitive to the environment. Rotary sensors with optical detection of occultations do not operate satisfactorily at low or high displacement velocities of the lever and depending on circumstances, they only detect the velocity or the position of the lever, and they are expensive. Field-effect sensors are very expensive and their implementation is complex and their sensitivity to external perturbations is very large. Finally, optical sensors used in the prior art generally comprise four photodetectors or photodetectors with four quadrants or an array of photodetectors with two rows and two columns, and can only track very limited angular displacements of the lever around one axis or two axes of rotation.

The present invention essentially relates to a device of the aforementioned type, which does not have such drawbacks of known means.

SUMMARY OF THE INVENTION

Accordingly, it is a primary object of the present invention to provide an improved control device equipped with reliable and inexpensive sensors, for detecting the position of the mobile component and for tracking its displacements around three axes of rotation over angular displacements of maximum value.

For this purpose, it provides a control device with a mobile component mounted on a ball pivot, wherein said component is adapted to be rotated around at least two different axes and the device comprises detection means for optically detecting the position of said component, said detection means being connected with information processing means and comprising at least two photodetector arrays for detecting points uniformly distributed over at least a support with the shape of a sphere or portion of a sphere, the arrays and the support being positioned around the ball pivot of said component and some being fixed and others being mobile and secured to the component.

By this combination of the photodetector arrays and of the support bearing uniformly distributed points optically detectable by the photodetector arrays, the positions of the mobile component and its displacements around two or three axes of rotation may be determined over large angular displacements, typically larger than 45° and which may attain 180° or even 360° around at least one aforementioned axis.

Further, the device according to the invention does not undergo any wear or hysteresis phenomenon able to interfere with the detection of the position and of the displacements of the mobile component, except as far as the ball pivot is concerned.

In a preferred embodiment of the invention, the photodetector arrays are fixed and the point support(s) are mobile and borne by the mobile component.

Preferably, the photodetector arrays are positioned at 90° to one another around an axis of rotation of the mobile component, which may be the axis of the component itself in a particular position, for example, a rest position.

The information processing means to which are connected the photodetector arrays comprise programmed means for determining the positions of the aforementioned points with respect to the photodetector arrays and for tracking the trajectories of these points upon displacements of the mobile component.

These programmed means, for example, are adapted for first searching within each array for a group of three photodetectors, which see a same point, and then, among the remaining photodetectors, the groups of two photodetectors seeing a same point, and, among the remaining photodetectors, the photodetector(s) which each see a point or a portion of a point overlapping an edge of an array, and then for determining the positions of the centers of the points seen by the photodetectors, and for repeating these determinations with a sufficient frequency so that the displacements of the points between two successive determinations are less than the radius of these points.

This processing may be performed at high speed by a microprocessor of a commercially available type.

Generally, the invention is applicable to control handles of the "joystick" type which may be used with video game consoles and computers, to measuring systems which use ball pivot mounted components, to prostheses, joints of robotic systems, and to any device with a jointed lever around two or three axes of rotation, notably gearshift levers for motor vehicles.

BRIEF DESCRIPTION OF THE DRAWINGS

The invention will be better understood and other features, details and advantages thereof will be more clearly apparent upon reading the description which follows, given by way of example, with reference to the appended drawings, wherein:

FIGS. 1 and 2 are front and top schematic views illustrating the principle of the device according to the invention, respectively;

FIG. 3 is a top schematic view of an alternative embodiment;

FIG. 4 is a schematic view at a larger scale of a uniform arrangement of points; and FIG. 5 illustrates the means for determining the position and the displacement in the device according to the invention.

DETAILED DESCRIPTION

In the embodiment of FIGS. 1 and 2, the device according to the invention, comprises a mobile component formed by a lever 10 mounted on a support 12 by a ball pivot joint comprising a ball head 14 with a spherical shape received in a housing 16 with a matching shape, the housing 16 for example being borne by the lever 10 whereas the ball head 14 is borne by support 12.

Elastic means 18 such as a unique spring preferably, are mounted between the lever 10 and the support 12 for constantly attracting the lever 10 into a rest position or a neutral position which is the one illustrated in the drawings. Lever 10 is secured to two supports 20 which are substantially identical sphere portions centered on the ball head 14 and which may be displaced by the lever 10 facing and in close vicinity of two photodetector arrays 22 borne by support 12, in an equidistant way with respect to the center of the ball pivot.

Preferably, arrays 22 are at 90° to one another around an axis 24 which passes through the center of the ball pivot 14 and which, for example, is perpendicular to the support 12, the supports 20 also being at 90° to one another around the center of the ball pivot. In FIG. 1, the supports 20 and arrays 22 are illustrated, diametrically opposite for sake of clarity, but the actual layout corresponds to the top schematic view in FIG. 2.

In this embodiment, the arrays 22 are radially outside the supports 20, but alternatively they may be placed radially inside these supports.

The external faces of supports 20 bear a series of uniformly distributed points 26 which are equidistant from one another as schematically illustrated in FIG. 4 where it is seen that these points 26 have a circular shape and are placed at the apexes of identical and adjacent equilateral triangles. These points are optically detectable by the photodetectors of the arrays 22, owing to their optical properties and/or their colors. For example, these points may be reflective, transparent and/or diffusive. They may also optionally be associated with illumination means, for example placed within the supports 20 when the points 26 are transparent and/or diffusive, or else outside the supports 20 when the points 26 are more or less reflective.

The dimensions of the points 26 and the distances between these points are matched to the dimensions of the photodetectors of arrays 22. For example, as schematically illustrated in FIG. 5, the photodetector 28 of arrays 22 are squared-shaped and the points 26 are circles with a diameter substantially equal to the side of the photodetectors 28. The distances between the points 26 are selected so that two points 26 may be detected by a 3×3 array of photodetectors 22 simultaneously and entirely, so that two adjacent or consecutive points 26 cannot be detected by the same photodetectors 28 and a 3×3 array may detect at least one point and less than three complete points, the distance between two points 26 for example being substantially equal to twice the side of a photodetector 28.

The outputs of the photodetectors 28 of arrays 22 are connected to inputs of information processing means 30 which, from the output signals of the photodetectors 28, generate signals 32 representing the position of the lever 10 in a coordinate system formed by three perpendicular axes passing through the center of the ball pivot 14 and enabling the displacements of the lever 10 in rotation around these axes to be tracked.

The information processing means 30 comprise computing means such as a microprocessor, which are programmed for determining the position and displacement of lever 10.

This determination is performed, for example, in the following way, for each array 22.

First, a search is carried out for a group of at least three photodetectors which detect the presence of one point 26. In the case of the array 22 illustrated on the left-hand portion of the FIG. 5, these are photodetectors 1, 2, 4 and 5. It is checked whether in this group there are at least two diametrically opposite photodetectors (in this example, these are photodetectors 1 and 5 as well as 2 and 4) and it is also checked whether the total of the output signals of the four photodetectors corresponds to the dimension of a point 26.

Next, a search is performed for a group of two photodetectors among photodetectors other than those found above, comprising the central photodetector 5 and seeing a point 26 (there are none in the case of the array 22 on the left-hand portion of FIG. 5).

A search is then performed among the remaining photodetectors for pairs of consecutive groups of two photodetectors of the contour of array 22, which detect a point 26, the contour of the array 22 comprising all photodetectors other than the central photodetector 5 (for example, 6,3 and 2,1; 3,2 and 1,4; etc.). Then a search is performed among the photodetectors not previously found, for a group of two photodetectors belonging to the contour and detecting a point 26 (in the case of array 22 on the left-hand portion of FIG. 5, these are photodetectors 6 and 9). A search is then performed among photodetectors other than those found up to now, for a photodetector of the contour on which a point 26 would be centered. It is then searched whether a photodetector 2, 4, 6 or 8 detects at least half of a point 26 for which the remainder would be outside the array 22, and it is checked whether the measurement is larger than half the dimension of a fill point. Finally, it is then searched whether a point 26 is centered on the central photodetector 5 and it is checked whether the measurement is comparable with that of a full point.

Next, from measurements provided by the photodetectors, the positions of the centers of points 26 in the plane of the array 22 are determined by a trigonometrical calculation.

This determination is repeated for tracking the displacement of the lever 10. After having determined the locations of the centers of the detected points 26, their displacements are determined from the offset between their positions in two successive determinations. In order not to lose the points between these two successive determinations, the corresponding displacements of the points must be less than the radius of the points.

When the time interval between two successive determinations is determined by a maximum sampling frequency of the photodetectors, the combination of this frequency and of the radius of the points 26 determines a maximum value for the measurable displacement velocity of lever 10.

In practice, the displacement of a point between two successive measurements is determined by associating a group of photodetectors detecting the point in the first measurement with a group of photodetectors detecting the same point in the next measurement. If this is not possible, a search is carried out among the groups of identified photodetectors in the second measurement, for a group which may be associated with a group of identified photodetectors in the first measurement, preferably the group of photodetectors for which the position of the point was determined with the best accuracy.

Thus, from the displacements of points 26 over both arrays 22, the displacement of the lever 10 around three different axes of rotations may be calculated.

To enhance detection sensitivity around an axis of rotation, one of the arrays 22 may be angularly offset as illustrated schematically in FIG. 3, by displacing it around this axis of rotation over an angular distance corresponding to half the angular extent of a photodetector 28.

Provision may also be made for facilitating the detection of a rest position or a neutral position of the lever, so that each support 20 comprises at least one point 26 different from the others by its optical properties detectable by the photodetectors 28. This reference point 26 may also have dimensions different from those of the other points 26.

In an embodiment, the supports 20 are photographic films, negatives or of the slide type which are deformed in portions of a sphere. The photographic film was previously exposed with an image bearing a distribution of points 26, which after spherical deformation, becomes comparable to that illustrated in FIG. 4 in the case of a plane.

In the described and illustrated exemplary embodiment, the photodetector arrays 22 comprise three rows and three columns of photodetectors. Of course, arrays comprising a larger number of photodetectors may be used, even if it is preferable to use 3×3 sized arrays, from a practical point of view.

Notably, arrays comprising eight photodetectors may be used, preferably 3×3 arrays in which the central detector or a peripheral detector has been suppressed or not connected. As a result, digital data acquisition is simplified as this amounts to the case of a 8 bits signal, i.e., a byte. By knowing the positions of the points one relatively to the other and what the eight photodetectors of the array see, it is possible to calculate what the 9th photodetector would see if it were present or connected and therefore the same result may be obtained as with a 3×3 array.

Moreover, the arrays 22 may be plane, as illustrated, or of a slightly bulging shape to fit the shape of the supports 20. Square arrays may also be used which comprise a plurality of elementary small sized photodetectors for which unitary dimensions are several times smaller than that of a point 26.

While in accordance with the provisions of the patent Statutes the preferred forms and embodiments of the invention have been illustrated and described, it will be apparent to those skilled in the art that various changes may be made without deviating from the inventive concepts set forth above.

What is claimed is:

1. A control device for detecting the position of a mobile component, comprising:
    (a) a mobile component (10);
    (b) ball pivot means (14, 16) connecting said mobile component for rotation around three different axes relative to a fixed component (12);
    (c) detection means for optically detecting the position of said mobile component relative to said fixed component said detection means being connected with an information processing means (30) and including:
        (1) a pair of point supports (20) each defined by portions of a sphere that is concentrically arranged about the axis of said ball pivot means, each of said point supports being connected with one of said mobile and fixed components and including a plurality of uniformly spaced optically detectable points (26); and
        (2) a pair of arrays of photodetectors (22) connected with the other of said fixed and mobile components opposite and spaced from said point supports, respectively:
    said information processing means including programmed means for determining the positions of the said points with respect to said photodectector arrays and for tracking the trajectories of said points upon displacements of the mobile component, said programmed means being programmed for first searching in each array for a group of three photodetectors seeing a same point, and then among the remaining photodetectors for a group of two photodetectors seeing a same point and comprising a central photodetector, and then among the remaining photodetectors, for the groups of two photodetectors of the contour of the array seeing a point and then among the remaining photodoctors, for photodectors each seeing one point or a portion of a point overlapping an edge of an array, and then for determining the positions of the centers of the points seen by the photodetectors, and for repeating these determinations with a sufficient frequency so that the displacements of the points between two successive determinations are less than the radius of a point.

2. A device according to claim 1, wherein the arrays of photodetectors are fixed and the said support is borne by the mobile component.

3. A device according to claim 1, wherein said photodetector arrays are positioned at 90° from one another around a rotation axis of the mobile component.

4. A device according to claim 3, wherein one of the arrays is angularly offset around said rotation axis, by an angular distance corresponding to half the angular extent of a photodetector.

5. A device according to claim 1, wherein each array comprises at least three rows and three columns of photodetectors.

6. A device according to claim 5, wherein one photodetector of each array of three rows and three columns of photodetectors is suppressed or disconnected.

7. A device according to claim 1, wherein the supports and the arrays of photodetectors are centered on the ball pivot.

8. A device according to claim 1, wherein the points are equidistant and located on apexes of identical and adjacent equilateral triangles.

9. A device according to claim 1, wherein each point has a dimension corresponding to at least that of a photodetector of the said arrays.

10. A device according to claim 1, wherein the points are optically transparent, reflecting, diffusive and/or colored.

11. A device according to claim 1, wherein said support bears at least one reference point for which the optical properties and/or the dimensions are different from those of the others points.

12. A device according to claim 11, wherein said other points are identical with one another.

13. A device according to claim 1,wherein the mobile component is a lever.

* * * * *